US008953679B2

(12) United States Patent
Kim et al.

(10) Patent No.: US 8,953,679 B2
(45) Date of Patent: Feb. 10, 2015

(54) METHODS AND APPARATUS FOR IMPLICIT BLOCK SEGMENTATION IN VIDEO ENCODING AND DECODING

(75) Inventors: Jae Hoon Kim, San Diego, CA (US); Yeping Su, Camas, WA (US); Peng Yin, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 1052 days.

(21) Appl. No.: 12/735,665

(22) PCT Filed: Jan. 15, 2009

(86) PCT No.: PCT/US2009/000263
§ 371 (c)(1),
(2), (4) Date: Aug. 5, 2010

(87) PCT Pub. No.: WO2009/099510
PCT Pub. Date: Aug. 13, 2009

(65) Prior Publication Data
US 2010/0329334 A1    Dec. 30, 2010

Related U.S. Application Data

(60) Provisional application No. 61/026,275, filed on Feb. 5, 2008.

(51) Int. Cl.
*H04N 11/02*       (2006.01)
*H04N 19/139*      (2014.01)
*H04N 19/51*       (2014.01)
*H04N 19/105*      (2014.01)
*H04N 19/176*      (2014.01)

(52) U.S. Cl.
CPC ... *H04N 19/00151* (2013.01); *H04N 19/00587* (2013.01); *H04N 19/00024* (2013.01); *H04N 19/00278* (2013.01)
USPC ............. 375/240.12; 375/240.24; 375/240.25

(58) Field of Classification Search
CPC ................. H04N 19/00278; H04N 19/00569; H04N 19/00781; H04N 19/00884; H04N 19/00763; H04N 19/00042; H04N 19/00036; H04N 19/00024; H04N 19/00696; H04N 19/0003; H04N 19/00212; H04N 19/00303; H04N 19/00351; H04N 19/00672; H04N 7/32; H04N 7/50; H04N 19/00; H04N 19/00218; H04N 19/00272; H04N 19/00151; H04N 19/00587; G06T 9/004; G06T 2207/20021; G06T 7/0079; G06T 7/0083
USPC .......... 375/240.01–240.29; 348/394.1, 409.1, 348/411.1, 412.1, 415.1; 382/238
See application file for complete search history.

(56) References Cited

U.S. PATENT DOCUMENTS 6,373,988 B1 *   4/2002   Thorell et al. ............... 382/240
6,711,211 B1 *   3/2004   Lainema .................. 375/240.24
(Continued)

FOREIGN PATENT DOCUMENTS

CN    1863302 A    11/2006
JP    64069180     3/1989
(Continued)

OTHER PUBLICATIONS

Salgado et al., "Efficient Image Segmentation for Region-Based Motion Estimation and Compensation", IEEE Transactions on Circuits and Systems for Video Technology, Vo. 10, No. 7, Oct. 1, 2000, pp. 1029-1039.
(Continued)

*Primary Examiner* — Sath V Perungavoor
*Assistant Examiner* — Nathnael Aynalem
(74) *Attorney, Agent, or Firm* — Robert D. Shedd; Ronald J. Kolczynski

(57) ABSTRACT

Methods and apparatus are provided for implicit block segmentation in video encoding and decoding. An apparatus includes an encoder for encoding at least a portion of a picture using a block segmentation process performed on a pixel difference of at least two predictors for the portion. The encoder implicitly signals block segmentation information for use by a decoder to decode the portion.

38 Claims, 5 Drawing Sheets

(56) References Cited

U.S. PATENT DOCUMENTS

| | | | | |
|---|---|---|---|---|
| 7,903,742 | B2* | 3/2011 | Boyce | 375/240.25 |
| 2004/0008778 | A1* | 1/2004 | Yang et al. | 375/240.16 |
| 2004/0258162 | A1* | 12/2004 | Gordon et al. | 375/240.25 |
| 2006/0133492 | A1* | 6/2006 | Boyce | 375/240.16 |
| 2006/0140279 | A1 | 6/2006 | Murakami et al. | |
| 2007/0140342 | A1* | 6/2007 | Karczewicz et al. | 375/240.12 |
| 2007/0177671 | A1* | 8/2007 | Yang | 375/240.25 |
| 2008/0089596 | A1* | 4/2008 | Choi et al. | 382/238 |

FOREIGN PATENT DOCUMENTS

| | | |
|---|---|---|
| JP | 09121355 | 5/1997 |
| JP | 2006246351 | 9/2006 |

OTHER PUBLICATIONS

Chang et al., "A Linear-Time Component-Labeling Algorithm Using Contour Tracing Technique", Institute of Information Science, Academia Sinica, Taipei, Taiwan, 20 pages.

Kim et al., "Motion Compensation Based on Implicit Block Segmentation", 15th IEEE International Conference on Image Processing, Oct. 12, 2008, pp. 2452-2455.

Escoda et al. Thomson Corp. Research, Princeton, NJ; Dai et al., West Virginia University Dept. of CS&EE, Morgantown, WV; "Geometry-Adaptive Block Partitioning for Video Coding"; 4 pages.

Orchard, "Predictive Motion-Field Segmentation for Image Sequence Coding", IEEE Transactions on Circuits and Systems for Video Technology. vol. 3, No. 1, Feb. 1, 1993, New York, NY, pp. 54-70.

Shukla et al., "Rate-Distoration Optimized Tree-Structured Compression Algorithms for Piecewise Polynomial Images", IEEE Transactions on Image processing, vol. 14, No. 3, Mar. 2005.

Wiegand et al., "Overview of the H.264/AVC Video Coding Standard", IEEE Transactions on Circuits and Systems for Video Technolgoy, Jul. 2003.

Kim et al., "New Coding Tools for Illumination and Focus Mismatch Compensation in Multiview Video Coding", IEEE Transactions on Circuits and Systems for Video Technology, vol. 17, No. 11. Nov. 2007, pp. 1519-1535.

PCT Search Report dated: Jul. 6, 2009.

\* cited by examiner

METHODS AND APPARATUS FOR IMPLICIT BLOCK SEGMENTATION IN VIDEO ENCODING AND DECODING

CROSS-REFERENCE TO RELATED APPLICATIONS

This application claims the benefit, under 35 U.S.C. §365 of International Application PCT/US2009/000263 and filed Jan. 15, 2009, which was published in accordance with PCT Article 21(2) on Aug. 13, 2009, in English, and which claims the benefit of U.S. Provisional Patent Application No. 61/026,275, filed on Feb. 5, 2008, in English, which are incorporated by reference in their respective entireties.

TECHNICAL FIELD

The present principles relate generally to video encoding and decoding and, more particularly, to methods and apparatus for implicit block segmentation in video encoding and decoding.

BACKGROUND

Numerous approaches have been proposed to provide more accurate motion compensation by providing different predictions for different regions in a macroblock. Examples include techniques used in the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard") or the hierarchical quadtree (QT) approach.

In these approaches, a macroblock is split into smaller blocks and a search is performed to find the best match for each block. As the number of blocks in a macroblock increases, overhead increases while distortion between the original macroblock and the matching macroblock decreases. Therefore, there is a minimum rate-distortion point and the best block mode is typically decided by a Lagrangian tool.

In order to increase the matching capability using a square or rectangular block shape in the quadtree approach, a geometry based approach (GEO) has been proposed. In the geometry based approach, a block is split into two smaller blocks called wedges by a line described by a slope and translation parameters. The best parameters and matching wedges are searched together. Although the geometry based approach captures object boundaries better than the quadtree approach, the geometry based approach is still limited to a straight line segmentation or partition.

An object based motion segmentation method has been proposed to solve the occlusion problem. In accordance with the object based motion segmentation method, motion vectors from neighboring blocks are copied after block segmentation in order to capture different motions in a block. To avoid transmitting segmentation information, previously encoded frames at time (t−1) and time (t−2) are used to estimate segmentation for the current frame at time (t).

Motion-compensated predictive coding (MCPC) is the technique that has been found to be the most successful for exploiting inter-frame correlations. In a motion-compensated predictive coding scheme, the difference between the original input frame and the prediction from decoded frames is coded. This difference frame is usually known as the prediction error frame.

The purpose of employing predictions is to reduce the energy of the prediction error frames so that the prediction error frames have lower entropy after transformation and can therefore be coded with a lower bit rate. One of the major design challenges in video compression is how to enhance the quality of prediction or, in other words, to have predictors that are as close to the current signal as possible.

In current block based motion compensation or disparity compensation, fixed size rectangular blocks limit the capability to find better predictors for the original block context, which can be any arbitrary shape. Block based search approaches find a match for a dominant part within a block such that occluded objects are not well predicted. Considering the accuracy of prediction, an optimal method is to segment the original block into different objects and search for the match for each segment. However, this requires the encoder to transmit segment information to the decoder and this extra overhead overwhelms the benefit from the enhanced predictor.

SUMMARY

These and other drawbacks and disadvantages of the prior art are addressed by the present principles, which are directed to methods and apparatus for implicit block segmentation in video encoding and decoding.

According to an aspect of the present principles, there is provided an apparatus. The apparatus includes an encoder for encoding at least a portion of a picture using a block segmentation process performed on a pixel difference of at least two predictors for the portion. The encoder implicitly signals block segmentation information for use by a decoder to decode the portion.

According to another aspect of the present principles, there is provided a method. The method includes encoding at least a portion of a picture using a block segmentation process performed on a pixel difference of at least two predictors for the portion. The encoding step includes implicitly signaling block segmentation information for use by a decoder to decode the portion.

According to yet another aspect of the present principles, there is provided an apparatus. The apparatus includes a decoder for decoding at least a portion of a picture using a block segmentation process performed on a pixel difference of at least two predictors for the portion. The decoder implicitly determines block segmentation information.

According to a further aspect of the present principles, there is provided a method. The method includes decoding at least a portion of a picture using a block segmentation process performed on a pixel difference of at least two predictors for the portion. The decoding step includes implicitly determining block segmentation information.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
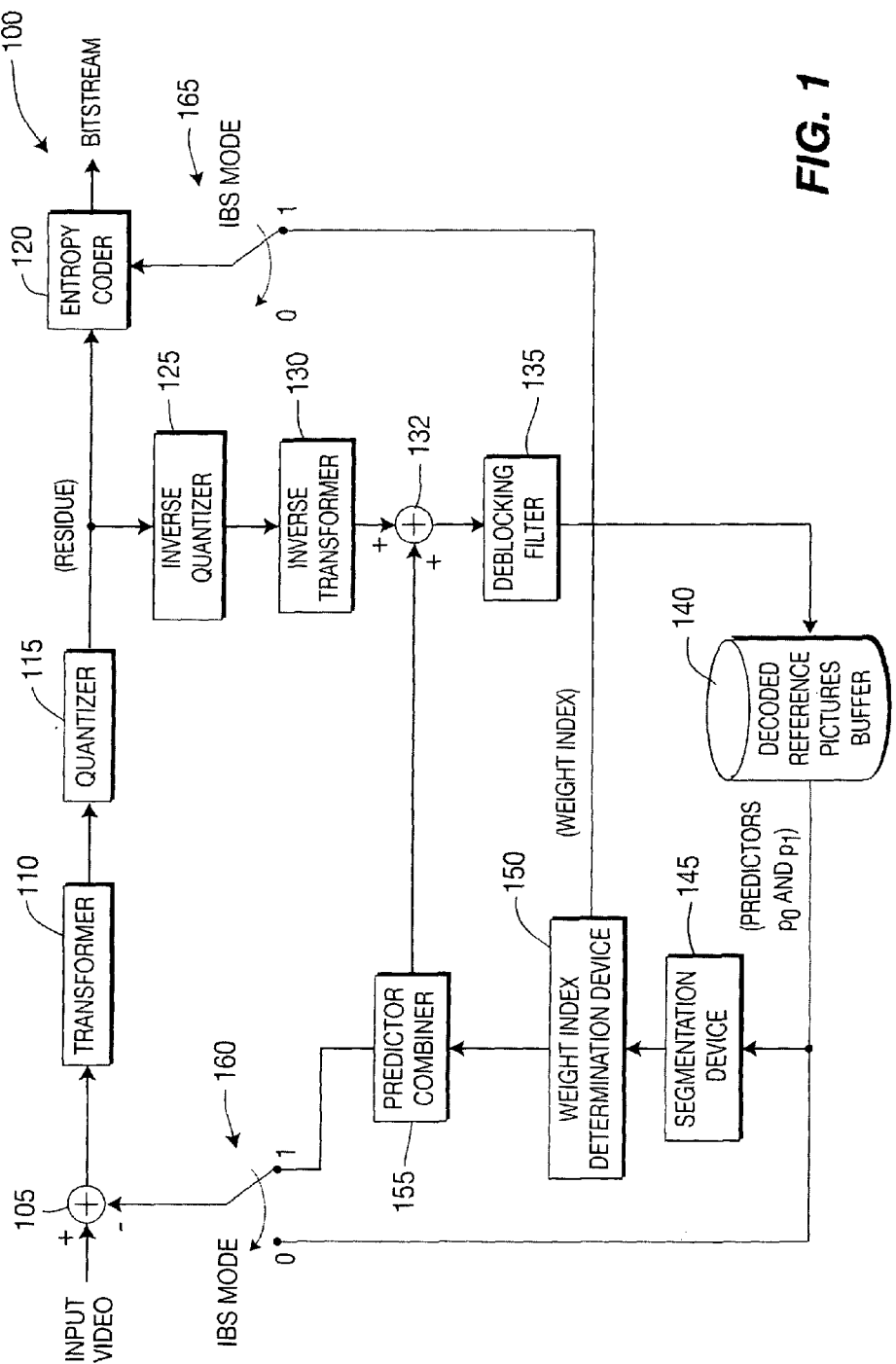
FIG. 1 is a block diagram for an exemplary encoder with an implicit block segmentation (IBS) block mode, in accordance with an embodiment of the present principles.

The present principles are directed to methods and apparatus for implicit block segmentation in video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles. For example, given the teachings of the present principles provided herein, one of ordinary skill in this and related arts can readily apply the present principles to scalable video coding (SVC) and multi-view video coding (MVC) environments, while maintaining the spirit of the present principles. Multi-view video coding (MVC) is the compression framework for the encoding of multi-view sequences. A Multi-view Video Coding (MVC) sequence is a set of two or more video sequences that capture the same scene from a different view point. Scalable video coding (SVC) refers to encoding a video sequence into a bitstream having a base layer and one or more enhancement layers.

Further, as interchangeably used herein, "cross-view" and "inter-view" both refer to pictures that belong to a view other than a current view.

Moreover, as used herein, the phrase "block segmentation information" refers to information describing the segmentation of at least one or more reference pictures or portions thereof used to encode and/or decode a portion of a current picture. In an embodiment, such block segmentation information relates to segmentation applied to the difference between at least two predictors. In an embodiment, such block segmentation information relates to information indicating which pixel of a particular reference picture belongs to which segment of the particular reference picture segmented according to a block segmentation process. It is to be noted that such block segmentation information is not explicitly signaled to a corresponding decoder. Rather, such block segmentation information may be implicitly signaled using one or more syntax elements including, but not limited to, high level syntax elements.

Also, as used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

As noted above, the present principles are directed to methods and apparatus for implicit block segmentation in video encoding and decoding.

Turning to FIG. 1, an exemplary encoder with an implicit block segmentation (IBS) block mode is indicated generally by the reference numeral 100.

An output of a combiner 105 is connected in signal communication with an input of a transformer 110. An output of the transformer 110 is connected in signal communication with an input of a quantizer 115. An output of the quantizer 115 is connected in signal communication with a first input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 132. An output of the deblocking filter 135 is connected in signal communication with an input of decoded reference pictures buffer 140. An output of the decoded reference pictures buffer 140 is connected in signal communication with an input of a segmentation device 145 and a second input of a switch 160.

An output of the segmentation device 145 is connected in signal communication with an input of a weight index determination device 150. A first output of the weight index determination device 150 is connected in signal communication with an input of a predictor combiner 155. A first output of the predictor combiner 155 is connected in signal communication with a first input of the switch 160. An output of the switch 160 is connected in signal communication with an inverting input of the combiner 105. A second output of the predictor combiner 155 is connected in signal communication with a second non-inverting input of the combiner 132. An output of the combiner 132 is connected in signal communication with an input of a deblocking filter 135.

A second output of the weight index determination device 150 is connected in signal communication with a first input of a switch 165. A second input of the switch 165 is left unconnected. An output of the switch 165 is connected in signal communication with a second input of the entropy coder 120.

A non-inverting input of the combiner 105 is available as an input of the encoder 100, for receiving input video. An output of the entropy coder 120 is available as an output of the encoder 100, for outputting a bitstream.

The weight index determination device 150 finds the weight index for each segment (as determined by segmentation device 145). The predictor combiner 155 combines the predictors for each segment.

In FIG. 1, IBS mode is enabled when the first input of switch 160 and the first input of switch 165 are both used.

Figure 2:
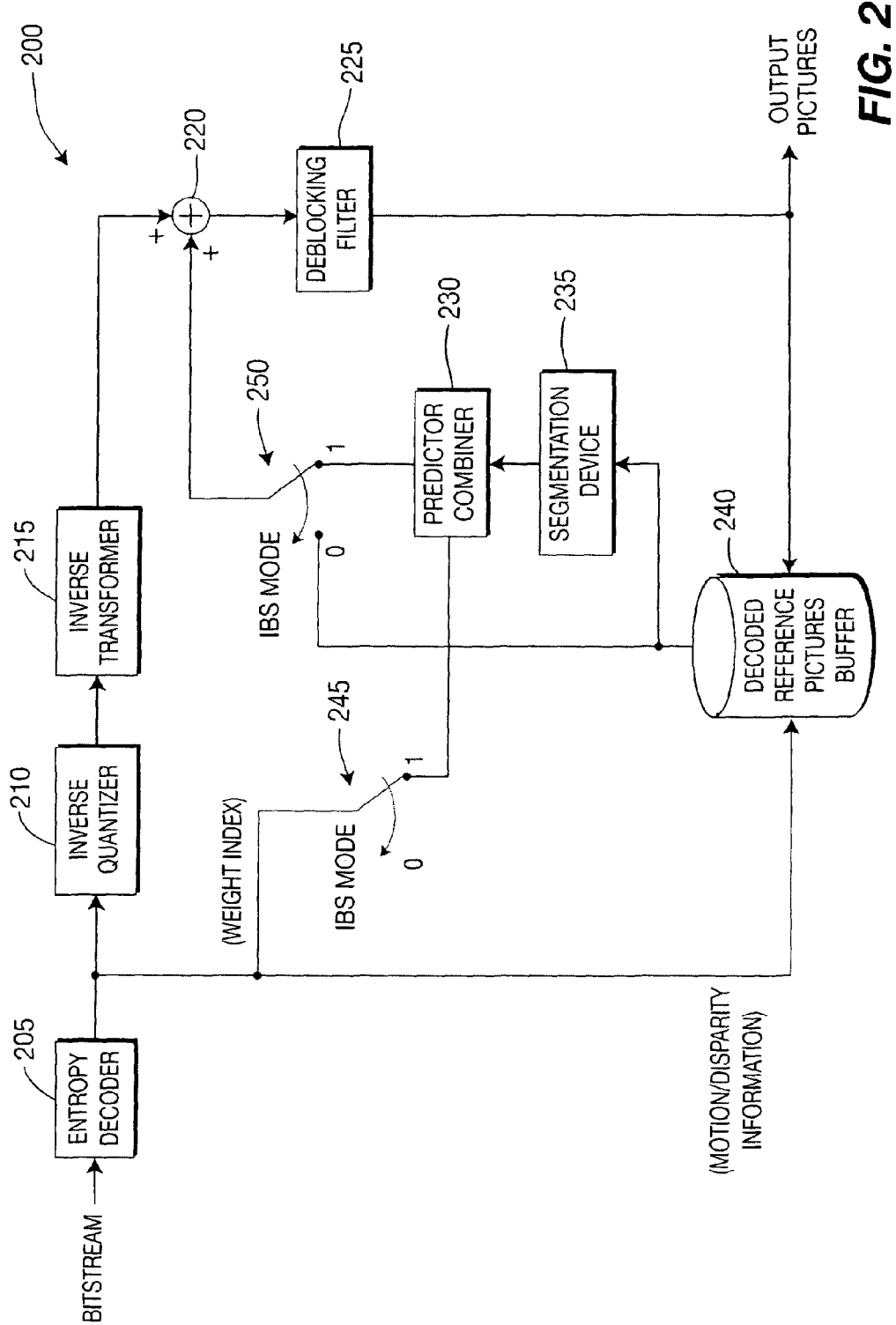
FIG. 2 is a block diagram for an exemplary decoder with an implicit block segmentation (IBS) block mode, in accordance with an embodiment of the present principles.

Turning to FIG. 2, an exemplary decoder with an implicit block segmentation (IBS) block mode is indicated generally by the reference numeral 200.

An output of an entropy decoder 205 is connected in signal communication with an input of an inverse quantizer 210, a first input of a decoded reference pictures buffer 240, and a first input of a switch 245. A second input of the switch 245 is left unconnected. An output of the inverse quantizer 210 is connected in signal communication with an input of an inverse transformer 215. An output of the inverse transformer 215 is connected in signal communication with a first non-inverting input of a combiner 220. An output of the combiner 220 is connected in signal communication with an input of a deblocking filter 225. An output of the deblocking filter 225 is connected in signal communication with a second input of the decoded reference pictures buffer 240. An output of the decoded reference pictures buffer 240 is connected in signal communication with an input of a segmentation device 235 and a second input of a switch 250. An output of the segmentation device 235 is connected in signal communication with a first input of predictor combiner 230. An output of the predictor combiner 230 is connected in signal communication with a first input of the switch 250. An output of the switch 250 is connected in signal communication with a second non-inverting input of the combiner 220. An output of the switch 245 is connected in signal communication with a second input of the predictor combiner 230.

An input of the entropy decoder 205 is available as an input of the decoder 200, for receiving a bitstream. The output of the deblocking filter 225 is available as an output of the decoder 200, for outputting a sequence of pictures.

In FIG. 2, IBS mode is enabled when the first input of switch 145 and the first input of switch 150 are both used.

Thus, in accordance with the present principles, method and apparatus are provided for video encoding and decoding wherein the original block is not segmented. Instead, we apply segmentation to the reference blocks available at the decoder and, thus, remove the need for extra overhead being sent to the decoder to describe segmentation. In accordance with the present principles, we estimate a predictor by combining candidate predictors, which extends the ways in which prediction signals can be formed in existing video coding standards. The present principles differ from existing approaches in that the present principles use block segmentation without explicit signaling, which provides the ability to adapt to local signal characteristics with no extra overhead. In an embodiment, we apply implicit segmentation in an MPEG-4 AVC Standard environment. However, as noted above, the present principles are not limited solely to the MPEG-4 AVC Standard.

Encoding Algorithm for Implicit Block Segmentation (IBS)

For illustrative purposes, presume two predictors $p_0$, $p_1$ are available for a given macroblock (e.g., two 16×16 blocks from neighboring frames), where $p_0$ is referred to as a base predictor and $p_1$ is referred to as a base predictor. These two predictors $p_0$, $p_1$ have been chosen by the encoder, and the position of the two predictors $p_0$, $p_1$ will be signaled to the decoder. The optimal segmentation for the purpose of prediction would be such that each pixel in the original macroblock is assigned to whichever predictor, $p_0$ or $p_1$, provides the best approximation. However, this cannot be done implicitly (without sending side information) since the decision depends on the original block itself. Based on the observations about the expected gain that is dependent upon the differences between predictors, we apply segmentation to the block of predictor differences, $p_d = p_0 - p_1$. Due to the noisy characteristics of predictor differences, edge based segmentation methods do not detect simple boundaries efficiently in 16×16 macroblocks.

Figure 3:
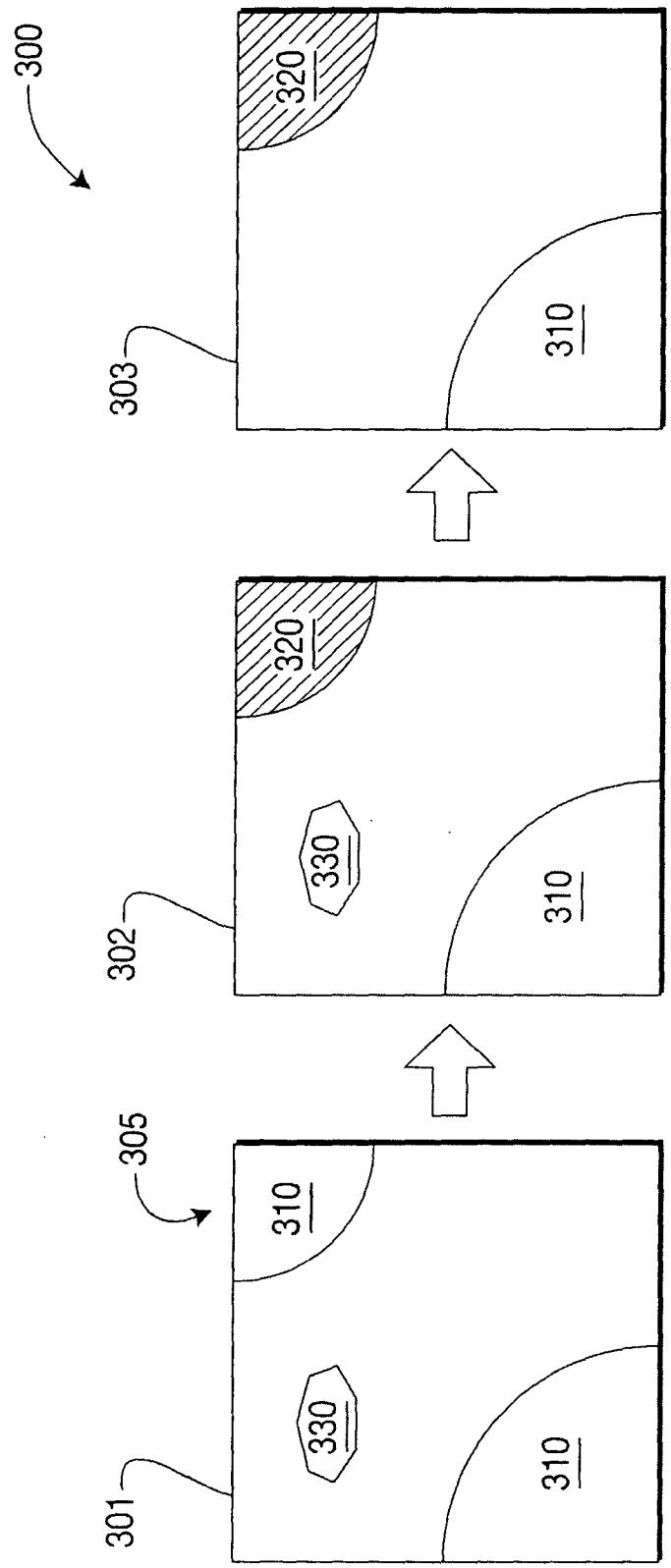
FIG. 3 is a diagram showing an example of post processing performed with respect to one-dimensional K-means clustering for picture segmentation to which the present principles may be applied.

In a prior art approach, hereinafter referred to as the "k-means clustering prior art approach", one-dimensional (1-D) k-means clustering is used as a basic segmentation algorithm. In accordance with the k-means clustering prior art approach, $N_0$ centroids are initialized at the uniform distance between the maximum and minimum value of $p_d$. The maximum run (i.e., number of iterations) is set to 20. After k-means clustering, disconnected pixels exist which belong to the same segment since spatial connectivity is not considered in one-dimensional k-means clustering. A two step post-processing is applied to take spatial information into account. Turning to FIG. 3, an example of post processing performed with respect to one-dimensional K-means clustering for picture segmentation is indicated generally by the reference numeral 300. As a first step in the two-step post-processing, disconnected pixels 305 assigned to the same segment 310 are classified into different segments using connected component labeling. Thus, with respect to the leftmost block 301 of FIG. 3, the segment 310 in the upper right side corner of block 301 becomes segment 320 in the middle block 302. Second, to prevent noisy segments, if the number of pixels in a segment 330 is smaller than $N_{pix}$, then the segment 330 is merged into the neighboring segment (e.g., from among segments 310 and 320) that has the minimum segment-mean difference with the current segment 330. It is to be noted that the number of segments depends on the disparities between the base and enhancement predictors. In the k-means clustering prior art approach, $N_0$ and $N_{pix}$ are respectively set to be 2 and 10, experimentally.

The optimal weight can be calculated for each segment by minimizing the sum of squared difference. However, after the optimal weights are calculated using information from the block to be encoded, the chosen values have to be signaled. For 16×16 blocks, this signaling overhead may not be justified given the overall reductions in residual error. In order to limit the overhead, in an embodiment, weights are selected from a pre-defined set $W=\{(1,0), (0,1), (½, ½)\}$, corresponding to using $\{p_0, p_1, (p_0+p_1)/2\}$ for prediction, respectively. Thus, a weight index with only three values $\{0, 1, 2\}$ is to be signaled. In summary, prediction for the block to be encoded is achieved by signaling the two predictors, $p_0$ and $p_1$, and the weights to be used for each segment. The segmentation itself is generated by the encoder and decoder in the same manner from the decoded predictors, so that there is no need for side information to be sent.

Other Encoding Algorithms and Variations

In addition to the above described encoding algorithm for implicit block segmentation, one or more of the following can also be applied to improve the efficiency of implicit block segmentation:

a. Segmentation Method
  i) An edge based segmentation method may used. For example, a Canny edge detector and/or a Sobel edge detector may be used for segmentation and disconnected edges may be connected using the Hough transform.

b. Target of Segmentation
  i) A base layer predictor(s) may be used for segmentation. For example, instead of segmenting the predictor difference between the base layer and enhancement layer predictors, only the base layer predictor from the available references may be used for implicit block segmentation. Since the references are also available at the decoder, segment information is not signaled.
  ii) A depth map(s) may be used for segmentation. For example, if a depth map is available in multi-view video sequences, then the depth map can be used for segmentation since object depths are accurate cues to estimate object boundaries. To make segmentation implicit, the same depth map may be made available at the decoder.

c. Search Method
  i) A limited set of enhancement predictor candidates may be used. For example, to reduce the complexity of the search associated with segmentation, a limited set of base layer predictor candidates may be used. To reduce the complexity further, a limited set of enhancement layer predictor candidates may be used instead of a full search. The same set for the base layer predictor candidates can be used for the enhancement layer predictor candidates.
  ii) A full search for both the base layer and enhancement layer predictors may be performed. For example, maximum coding efficiency can be achieved if both the base layer and enhancement layer predictors are searched in a full search range. This approach offers the maximum coding efficiency of implicit block segmentation.

d. Error Metric
  Since the segmentation boundary does not conform to the 4×4 or 8×8 block discrete cosine transform (DCT) boundary in the MPEG-4 AVC Standard, if DC levels of the residual are different at different segments, then high frequency components will increase after the discrete cosine transform. The sum of absolute differences (SAD) or sum of squared differences (SSD) cannot measure AC increases and, thus, a different error metric to measure the quantity of any AC increase may be used to find a better match. For example, the Hadamard error metric may be used to select a weight index.

e. Additional Weight Index
  Since signaling of the optimal weights can overwhelm the gains in the segments of a 16×16 macroblock, a predefined weight set W is used instead. Weights in set W can be extended from a basic set of (1,0) and (0,1). Indices are assigned based on the frequency of occurrence of weights. If weights are selected more frequently, then the smaller index is assigned. For example, additional weight (¾, ¼) (¼, ¾) can be added to set W and mapped into '3' and '4', respectively. Binary arithmetic coding (BAC) or variable length coding (VLC) will make these indices chosen only when there are enough coding gains.

Decoding Algorithm for Implicit Block Segmentation (IBS)

At the decoder, additional information from the encoding process may include the type of predictors used in a macroblock. For example, if two predictors are used, namely, a base layer predictor and an enhancement layer predictor, then this information may ultimately be conveyed to the decoder. Moreover, such additional information may include the weight indexes for each segment.

Utilizing this information, the following algorithm is applied for implicit block segmentation (IBS):

1. Decode the syntax.
2. Obtain the base layer predictor ($p_0$) and enhancement layer predictor ($p_1$). The predictor difference is calculated from the two predictors as follows: $p_d = p_0 - p_1$.
3. Based on the context of base layer predictor $p_0$ and enhancement layer predictor $p_1$, apply the same segmentation method to predictor difference $p_d$ as that applied at the encoder. For example, a segmentation process including, but not limited to, one dimensional (1-D)

k-means clustering, edge-based segmentation, and so forth, can be applied with post-processing.
4. For each segment, using the weight index sent from encoder, the sum of the weighted predictor is calculated for each segment.

Although the number of enhancement predictors is limited to one in the above algorithm, it is readily appreciated by one of ordinary skill in this and related arts that multiple predictors can be used for enhancement predictors. Also the weight index can be defined in any combination, if the weight index is shared by the encoder and the decoder. That is, we can define the weight matrix, as long as the encoder and decoder share the same information. Thus, "any combination" means "any useful combination" such as, for example, W={(1, 0), (0, 1), (½, ½), (⅓, ⅔), (⅙, ⅚)}. Of course, other combinations may also be used, while maintaining the spirit of the present principles.

Implicit Block Segmentation Implementation for the MPEG-4 AVC Standard

Implicit block segmentation (IBS) can be implemented in any video encoder and decoder. In an embodiment, the present principles are implemented with respect to the MPEG-4 AVC Standard. Current inter block modes are extended by inserting INTER16×16_IBS between the INTER16×16 and INTER16×8 modes. TABLE 1 shows macroblock type values 0 to 5 for P and SP slices.

predictor for a given base layer predictor, a simplified rate-distortion (R-D) cost, namely J, is defined as follows:

$$J = \left[\sum_{k=1}^{N} \min_{w_k} \{SAD_k\}\right] + \sqrt{\lambda} NB + \sqrt{\lambda} MV_{cost}(\bar{p}_1)$$

where N is the number of segments in $p_d$, B is the number of bits for a weight index per segment defined as B=log 2|W|, and MVcost($p_1$) is the motion vector cost of the enhancement layer predictor $p_1$. MVcost( ) and λ follow the encoding method in Joint Model reference software. For M base layer predictor candidates, equal numbers of matching enhancement layer predictors are found. Finally, the rate-distortion (RD) cost of M base layer and enhancement layer predictor pairs are calculated and compared with the rate-distortion costs of other block modes in the MPEG-4 AVC Standard (e.g., using a rate-distortion mode decision). Encoded information in INTER16×16_IBS includes reference indices and motion vectors for the base layer and enhancement layer predictors as well as the weight indices for each segment. Weight indices are encoded by, for example, variable length code in a rate-distortion mode decision and by binary arith-

TABLE 1

| mb_type | Name of mb_type | NumMbPart (mb_type) | MbPartPredMode (mb_type, 0) | MbPartPredMode (mb_type, 1) | MbPartWidth (mb_type) | MbPartHeight (mb_type) |
|---|---|---|---|---|---|---|
| 0 | P_L0_16×16 | 1 | Pred_L0 | na | 16 | 16 |
| 1 | P_L0_L0_16×16_IBS | 2 | Pred_L0 | Pred_L0 | 16 | 16 |
| 2 | P_L0_L0_16×8 | 2 | Pred_L0 | Pred_L0 | 16 | 8 |
| 3 | P_L0_L0_8×16 | 2 | Pred_L0 | Pred_L0 | 8 | 16 |
| 4 | P_8×8 | 4 | na | na | 8 | 8 |
| 5 | P_8×8ref0 | 4 | na | na | 8 | 8 |
| inferred | P_Skip | 1 | Pred_L0 | na | 16 | 16 |

To reduce the search complexity, we use a limited set of candidates for the base layer predictor $p_0$ while we search fully for the enhancement layer predictor $p_1$. The best candidates for the base predictor are collected from the best matches by the following modes: INTER16×16; INTER16× 8; INTER8×16; and INTER8×8. Also, the best matches of the original macroblock segment are added into a set of base layer predictor candidates. The best matches of the original macroblock segments can be found using a motion search step of INTER16×16.

To select the best predictor pair ($p_0$, $p_1$) for INTER16× 16_IBS, in an embodiment, three different error metrics are used. For each base layer predictor candidate, the best complementary enhancement layer predictor is searched for within the search range. The first error metric is the sum of absolute difference, which is used to decide the weight index for each segment. The sum of absolute difference of each segment is calculated for all weights in set W and the weight index with the minimum sum of absolute difference is chosen. Second, in the selection of the best enhancement layer metic code in bit stream coding. Of course, other coding techniques may also be used, while maintaining the spirit of the present principles.

Exemplary slice header syntax is shown in TABLE 2.

TABLE 2

| Slice_header( ) { | C | Descriptor |
|---|---|---|
| first_mb_in_slice | 2 | ue(v) |
| IBS_prediction_flag | 2 | u(v) |
| slice_type | 2 | ue(v) |
| pic_parameter_set_id | 2 | ue(v) |
| frame_num | 2 | u(v) |
| ... | | |

Exemplary macroblock prediction syntax is shown in TABLE 3.

TABLE 3

| Mb_pred( mb_type ) { | C Descriptor |
|---|---|
| if( MbPartPredMode( mb_type, 0 ) = = Intra_4×4 \|\| MbPartPredMode( mb_type, 0 ) = = Intra_16×16 ) { if( MbPartPredMode( mb_type, 0 ) = = Intra_4×4 ) | |

TABLE 3-continued

| Mb_pred( mb_type ) { | C | Descriptor |
|---|---|---|
|     for( luma4x4BlkIdx=0; luma4x4BlkIdx<16; luma4x4BlkIdx++ ) { | | |
|       prev_intra4x4_pred_mode_flag[ luma4x4BlkIdx ] | 2 | u(1)\|ae(v) |
|       if( !prev_intra4x4_pred_mode_flag[ luma4x4BlkIdx ] ) | | |
|         rem_intra4x4_pred_mode[ luma4x4BlkIdx ] | 2 | u(3)\|ae(v) |
|     } | | |
|     intra_chroma_pred_mode | 2 | ue(v)\|ae(v) |
| } else if( MbPartPredMode( mb_type, 0 ) != Direct ) { | | |
|     for( mbPartIdx = 0; mbPartIdx < NumMbPart( mb_type ); mbPartIdx++) | | |
|       if( ( num_ref_idx_l0_active_minus1 > 0 \|\| | | |
|         mb_field_decoling_flag ) && | | |
|         MbPartPredMode( mb_type, mbPartIdx ) != Pred_L1 ) | | |
|         ref_idx_l0[ mbPartIdx ] | 2 | te(v)\|ae(v) |
|     for( mbPartIdx = 0; mbPartIdx < NumMbPart( mb_type ); mbPartIdx++) | | |
|       if( ( num_ref_idx_l1_active_minus1 > 0 \|\| | | |
|         mb_field_decoding_flag ) && | | |
|         MbPartPredMode( mb_type, mbPartIdx ) != Pred_L0 ) | | |
|         ref_idx_l1[ mbPartIdx ] | 2 | te(v)\|ae(v) |
|     for( mbPartIdx = 0; mbPartIdx < NumMbPart( mb_type ); mbPartIdx++) | | |
|       if( MbPartPredMode ( mb_type, mbPartIdx ) != Pred_L1 ) | | |
|         for( compIdx = 0; compIdx < 2; compIdx++ ) | | |
|           mvd_l0[ mbPartIdx ][ 0 ][ compIdx ] | 2 | se(v)\|ae(v) |
|     for( mbPartIdx = 0; mbPartIdx < NumMbPart( mb_type ); mbPartIdx++) | | |
|       if( MbPartPredMode( mb_type, mbPartIdx ) != Pred_L0 ) | | |
|         for( compIdx = 0; compIdx < 2; compIdx++ ) | | |
|           mvd_l1[ mbPartIdx ][ 0 ][ compIdx ] | 2 | se(v)\|ae(v) |
|     if ( IBS_prediction_flag && MbPartPredMode( mb_type,0 ) == P_L0_L0_16x16_IBS) { | | |
|       num_segment = extractSegment( ) | | |
|       for( i=0; i < num_segment; i++) { | | |
|         IBS_weight_idx[i] | 2 | se(v)\|ae(v) |
|       } | | |
|     } | | |
|   } | | |
| } | | |

With respect to TABLE 2, extractSegment ( ) is the function that calculates segments from signaled predictors by ref_idx_l0, ref_idx_l1, mvd_l0 and mvd_l1, and returns the number of segments found.

Figure 4:
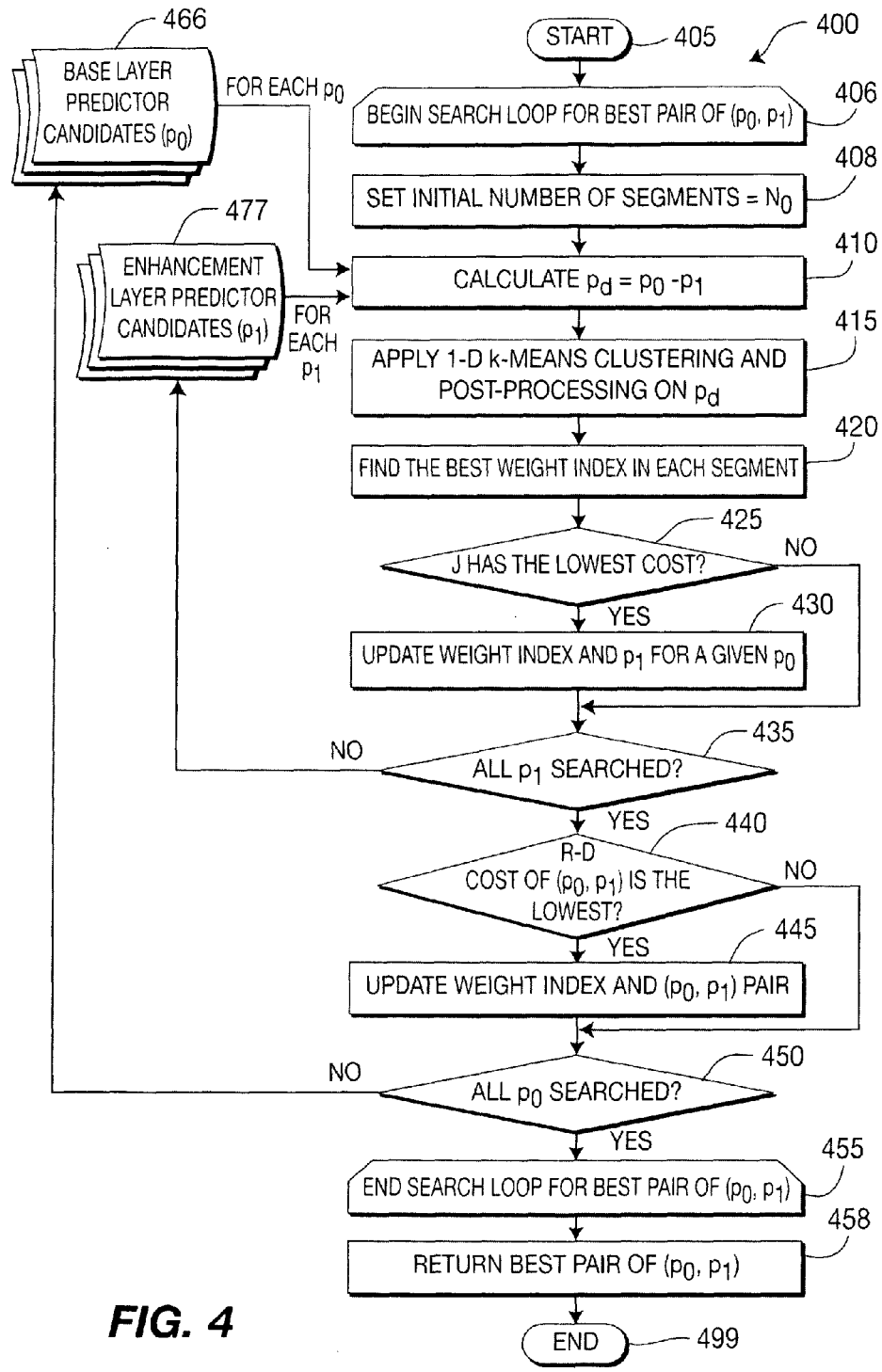
FIG. 4 is a flow diagram for an exemplary method for determining a predictor pair and associated weight index search for an image block, in accordance with an embodiment of the present principles.

Turning to FIG. 4, an exemplary method for determining a predictor pair and associated weight index search for an image block is indicated generally by the reference numeral 400. The method 400 may be implemented, for example, in a video encoder.

The method 400 includes a start block 405 that passes control to a loop limit block 406. The loop limit block 406 begins a loop for a best pair ($p_0$, $p_1$) of a base layer predictor and an enhancement layer predictor, and passes control to a function block 408. The function block 408 sets the initial number of segments to $N_0$, and passes control to a function block 410. The function block 410 calculates the predictor difference $p_d$ using base layer predictors {$p_0$} 466 and enhancement layer predictors {$p_1$} 477 such that $p_d = p_0 - p_1$, and passes control to a function block 415. The function block 415 applies one-dimensional (1-D) k-means clustering and post-processing on the predictor difference $p_d$, and passes control to a function block 420. The function block 420 finds the best weight index in each segment, and passes control to a decision block 425. The decision block 425 determines whether or not rate-distortion (R-D) cost j for a current segment has the lowest cost. If so, then control is passed to a function block 430. Otherwise, control is passed to a decision block 435.

The function block 430 updates the weight index and enhancement layer predictor $p_1$ for a given base layer predictor $p_0$, and passes control to the decision block 435.

The decision block 435 determines whether or not all enhancement layer predictors $p_1$ have been searched. If so, then control is passed to a decision block 440. Otherwise, control is returned to function block 410 so as to calculate predictor difference $p_d$ using a next one of the enhancement layer predictors {$p_1$} 477.

The decision block 440 determines whether or not the rate-distortion (R-D) cost of ($p_0$, $p_1$) is the lowest. If so, then control is passed to a function block 445. Otherwise, control is passed to the decision block 450.

The function block 445 updates the weight index and ($p_0$, $p_1$) pair, and passes control to the decision block 450.

The decision block 450 determines whether or not all base layer predictors $p_0$ have been searched. If so, then control is passed to a loop limit block 455. Otherwise, control is returned to the function block 410 so as to calculate predictor difference $p_d$ using a next one of the base layer predictors {$p_0$} 466.

The function block 455 ends the loop for the best pair of ($p_0$, $p_1$), and passes control to a function block 458. The function block 458 returns the best pair of ($p_0$, $p_1$), and passes control to an end block 499.

Figure 5:
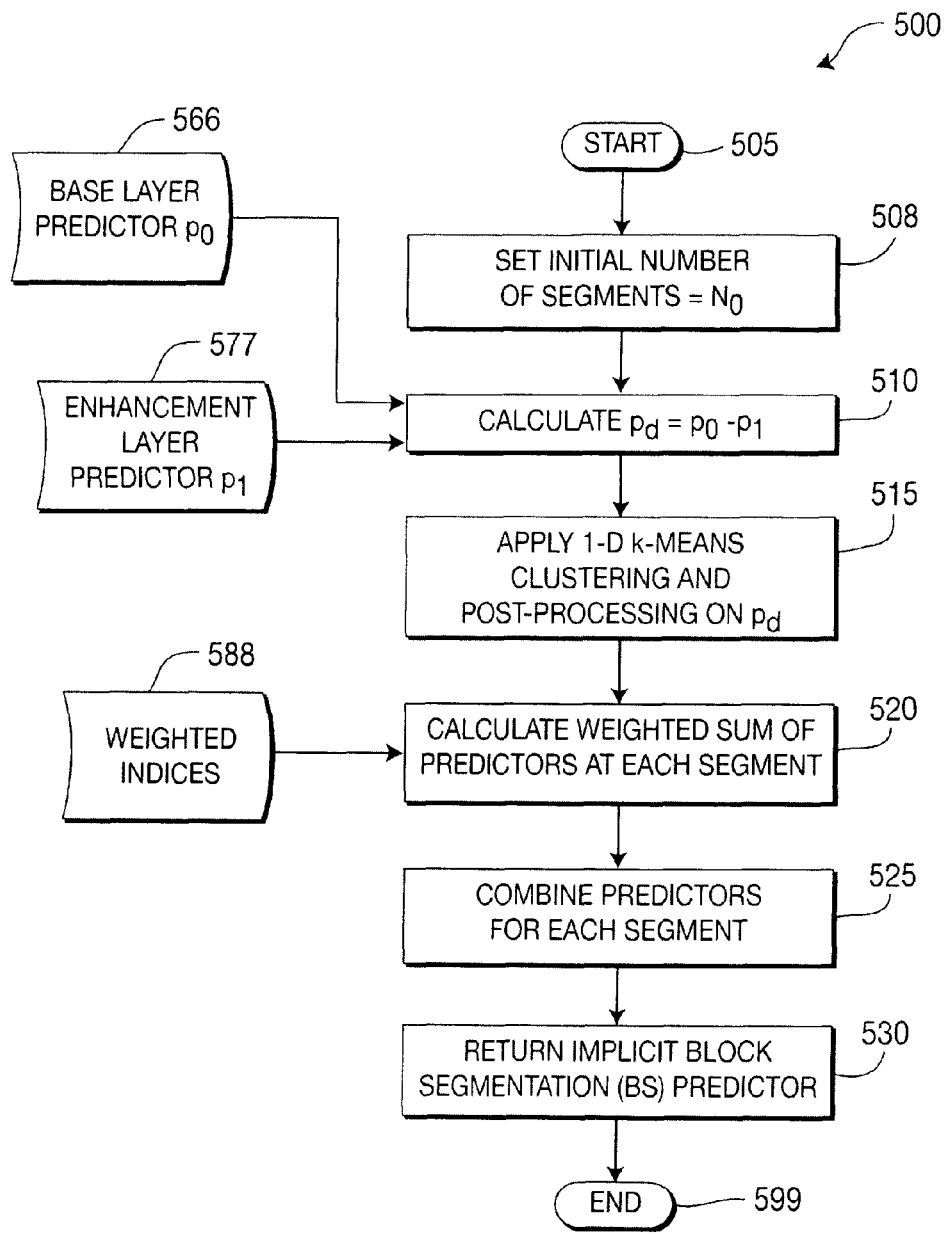
FIG. 5 is a flow diagram for an exemplary method for calculating an implicit block segmentation (IBS) predictor for an image block, in accordance with an embodiment of the present principles.

Turning to FIG. 5, an exemplary method for calculating an implicit block segmentation (IBS) predictor for an image block is indicated generally by the reference numeral 500. The method 500 may be implemented, for example, in a video decoder.

The method 500 includes a start block 505 that passes control to a function block 508. The function block 508 sets the initial number of segments to $N_0$, and passes control to a function block 510. The function block 510 calculates the predictor difference $p_d$ using base layer predictor $\{p_0\}$ 566 and enhancement layer predictor $\{p_1\}$ 577 such that $p_d = p_0 - p_1$, and passes control to a function block 515. The function block 515 applies 1-D k-means clustering and post-processing on predictor difference Pd, and passes control to a function block 520. The function block 520 calculates the weighted sum of predictors at each segment, using the weight indices 588, and passes control to a function block 525. The function block 525 combines predictors for each segment, and passes control to a function block 530. The function block 530 returns the implicit block segmentation (IBS) predictor, and passes control to an end block 599.

Combining with Mismatch Compensation Tool

Due to the 4×4 or 8×8 block discrete cosine transform in the MPEG-4 AVC Standard, when segment boundaries exist inside of discrete cosine transform blocks, the residual error by a different predictor tends to increase the AC component. This is severe if illumination mismatches are present in cross-view coding. Combining illumination compensation tools with the proposed implicit block segmentation (IBS) in accordance with the present principles would increase coding efficiency in cross-view prediction.

A description will now be given of some of the many attendant advantages/features of the present invention, some of which have been mentioned above. For example, one advantage/feature is an apparatus having an encoder for encoding at least a portion of a picture using a block segmentation process performed on a pixel difference of at least two predictors for the portion. The encoder implicitly signals block segmentation information for use by a decoder to decode the portion.

Another advantage/feature is the apparatus having the encoder as described above, wherein the encoder signals the at least two predictors for use by the decoder to decode the portion.

Yet another advantage/feature is the apparatus having the encoder as described above, wherein the encoder signals a weight index for use by the decoder to decode the portion.

Still another advantage/feature is the apparatus having the encoder as described above, wherein the block segmentation is performed with respect to at least one block in at least one reference picture.

Still yet another advantage/feature is the apparatus having the encoder as described above, wherein the block segmentation is performed using at least one of edge based segmentation and K-means clustering.

Moreover, another advantage/feature is the apparatus having the encoder as described above, wherein after the block segmentation the encoder applies post-processing to the pixel difference of the at least two predictors to remove noisy segments there from and exploit spatial information therein.

Further, another advantage/feature is the apparatus having the encoder as described above, wherein for each segment, the encoder computes a corresponding weight for each of the at least two predictors, and calculates a final predictor for the portion as a sum of weighted predictors.

Also, another advantage/feature is the apparatus having the encoder as described above, wherein the encoder signals at least one of motion information and disparity information associated with each of the at least two predictors.

Additionally, another advantage/feature is the apparatus having the encoder as described above, wherein the picture is one of a set of pictures corresponding to multi-view video content and having different view points with respect to a same or similar scene. The picture represents a current one of the different view points. At least one of the at least two predictors is an inter-view prediction corresponding to a particular one of the different view points other than the current one of the different view points. At least another one of the at least two predictors is a temporal prediction corresponding to the current one of the different view points.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding at least a portion of a picture using a block segmentation process, wherein said encoder includes a segmentation device for performing the block segmentation process on a pixel difference of at least two predictors for the portion, each of the at least two predictors corresponding to a respective one of at least two blocks in at least one reference picture and providing a respective predicted pixel value for each of pixels in the block,
wherein said encoder implicitly signals block segmentation information, the at least two predictors, and a weight index for use by a decoder to decode the portion, the block segmentation information indicating which reference picture pixel belongs to which reference picture segment obtained by the block segmentation process, and wherein said weight index indicates weight factors to be used on reference picture segments for calculating a weighted predictor for the portion from a predefined set of weights, and wherein disconnected pixels belonging to a same segment after segmentation are treated as different segments.

2. The apparatus of claim 1, wherein said encoder signals the at least two predictors for use by the decoder to decode the portion.

3. The apparatus of claim 1, wherein said encoder signals a weight index for use by the decoder to decode the portion.

4. The apparatus of claim 1, wherein the block segmentation is performed with respect to at least one block in at least one reference picture.

5. The apparatus of claim 1, wherein the block segmentation is performed using at least one of edge based segmentation and K-means clustering.

6. The apparatus of claim 1, wherein after the block segmentation said encoder applies post-processing to the pixel difference of the at least two predictors to remove noisy segments there from and exploit spatial information therein.

7. The apparatus of claim 1, wherein for each segment, said encoder computes a corresponding weight for each of the at least two predictors, and calculates a final predictor for the portion as a sum of weighted predictors.

8. The apparatus of claim 1, wherein said encoder signals at least one of motion information and disparity information associated with each of the at least two predictors.

9. The apparatus of claim 1, wherein the picture is one of a set of pictures corresponding to multi-view video content and having different view points with respect to a same or similar scene, the picture representing a current one of the different view points, wherein at least one of the at least two predictors is an inter-view prediction corresponding to a particular one of the different view points other than the current one of the different view points, and at least another one of the at least two predictors is a temporal prediction corresponding to the current one of the different view points.

10. A method, comprising:
encoding at least a portion of a picture using a block segmentation process, wherein said encoding step includes performing the block segmentation process on a pixel difference of at least two predictors for the portion, each of the at least two predictors corresponding to a respective one of at least two blocks in at least one reference picture and providing a respective predicted pixel value for each of pixels in the block,
wherein said encoding step comprises implicitly signalling block segmentation information, the at least two predictors, and a weight index for use by a decoder to decode the portion, the block segmentation information indicating which reference picture pixel belongs to which reference picture segment obtained by the block segmentation process, and wherein said weight index indicates weight factors to be used on reference picture segments for calculating a weighted predictor for the portion from a predefined set of weights, and wherein disconnected pixels belonging to a same segment after segmentation are treated as different segments.

11. The method of claim 10, wherein said encoding step comprises signaling the at least two predictors for use by the decoder to decode the portion.

12. The method of claim 10, wherein said encoding step comprises signaling a weight index for use by the decoder to decode the portion.

13. The method of claim 10, wherein the block segmentation is performed with respect to at least one block in at least one reference picture.

14. The method of claim 10, wherein the block segmentation is performed using at least one of edge based segmentation and K-means clustering.

15. The method of claim 10, further comprising applying post-processing, after the block segmentation, to the pixel difference of the at least two predictors to remove noisy segments there from and exploit spatial information therein.

16. The method of claim 10, wherein for each segment, said encoding step comprises computing a corresponding weight for each of the at least two predictors, and calculating a final predictor for the portion as a sum of weighted predictors.

17. The method of claim 10, wherein said encoding step comprises signaling at least one of motion information and disparity information associated with each of the at least two predictors.

18. The method of claim 10, wherein the picture is one of a set of pictures corresponding to multi-view video content and having different view points with respect to a same or similar scene, the picture representing a current one of the different view points, wherein at least one of the at least two predictors is an inter-view prediction corresponding to a particular one of the different view points other than the current one of the different view points, and at least another one of the at least two predictors is a temporal prediction corresponding to the current one of the different view points.

19. An apparatus, comprising:
a decoder for decoding at least a portion of a picture using a block segmentation process, wherein said decoder includes a segmentation device for performing the block segmentation process on a pixel difference of at least two predictors for the portion, each of the at least two predictors corresponding to a respective one of at least two blocks in at least one reference picture and providing a respective predicted pixel value for each of pixels in the block,
wherein said decoder implicitly determines block segmentation information, the at least two predictors, and a weight index for use by a decoder to decode the portion, the block segmentation information indicating which reference picture pixel belongs to which reference picture segment obtained by the block segmentation process, and wherein said weight index indicates weight factors to be used on reference picture segments for calculating a weighted predictor for the portion from a predefined set of weights, and wherein disconnected pixels belonging to a same segment after segmentation are treated as different segments.

20. The apparatus of claim 19, wherein the block segmentation information is implicitly determined from at least one syntax element.

21. The apparatus of claim 19, wherein said decoder receives signaling indicating the at least two predictors for use by the decoder to decode the portion.

22. The apparatus of claim 19, wherein said decoder receives a weight index for use by the decoder to decode the portion.

23. The apparatus of claim 19, wherein the block segmentation is performed with respect to at least one block in at least one reference picture.

24. The apparatus of claim 19, wherein the block segmentation is performed using at least one of edge based segmentation and K-means clustering.

25. The apparatus of claim 19, wherein after the block segmentation said decoder applies post-processing to the pixel difference of the at least two predictors to remove noisy segments there from and exploit spatial information therein.

26. The apparatus of claim 19, wherein for each segment, said decoder computes a corresponding weight from weight indices for each of the at least two predictors, and calculates a final predictor for the portion as a sum of weighted predictors.

27. The apparatus of claim 19, wherein said decoder receives at least one of motion information and disparity information associated with each of the at least two predictors for use in decoding the portion.

28. The apparatus of claim 19, wherein the picture is one of a set of pictures corresponding to multi-view video content and having different view points with respect to a same or similar scene, the picture representing a current one of the different view points, wherein at least one of the at least two predictors is an inter-view prediction corresponding to a particular one of the different view points other than the current one of the different view points, and at least another one of the at least two predictors is a temporal prediction corresponding to the current one of the different view points.

29. A method, comprising:
   decoding at least a portion of a picture using a block segmentation process, wherein said decoding step includes a segmentation device for performing the block segmentation process on a pixel difference of at least two predictors for the portion, each of the at least two predictors corresponding to a respective one of at least two blocks in at least one reference picture and providing a respective predicted pixel value for each of pixels in the block, wherein said decoding step comprises implicitly determining block segmentation information, the at least two predictors, and a weight index for use by a decoder to decode the portion, the block segmentation information indicating which reference picture pixel belongs to which reference picture segment obtained by the block segmentation process, and wherein said weight index indicates weight factors to be used on reference picture segments for calculating a weighted predictor for the portion from a predefined set of weights, and wherein disconnected pixels belonging to a same segment after segmentation are treated as different segments.

30. The method of claim 29, wherein the block segmentation information is implicitly determined from at least one syntax element.

31. The method of claim 29, wherein said decoding step comprises receiving signaling indicating the at least two predictors for use by the decoder to decode the portion.

32. The method of claim 29, wherein said decoding step comprises receiving a weight index for use by the decoder to decode the portion.

33. The method of claim 29, wherein the block segmentation is performed with respect to at least one block in at least one reference picture.

34. The method of claim 29, wherein the block segmentation is performed using at least one of edge based segmentation and K-means clustering.

35. The method of claim 29, wherein said decoding step comprises applying post-processing, after the block segmentation, to the pixel difference of the at least two predictors to remove noisy segments there from and exploit spatial information therein.

36. The method of claim 29, wherein for each segment, said decoding step comprises computing a corresponding weight from weight indices for each of the at least two predictors, and calculates a final predictor for the portion as a sum of weighted predictors.

37. The method of claim 29, wherein said decoding step comprises receiving at least one of motion information and disparity information associated with each of the at least two predictors for use in decoding the portion.

38. The method of claim 29, wherein the picture is one of a set of pictures corresponding to multi-view video content and having different view points with respect to a same or similar scene, the picture representing a current one of the different view points, wherein at least one of the at least two predictors is an inter-view prediction corresponding to a particular one of the different view points other than the current one of the different view points, and at least another one of the at least two predictors is a temporal prediction corresponding to the current one of the different view points.

* * * * *